United States Patent [19]
Lehman et al.

[11] Patent Number: 5,908,492
[45] Date of Patent: Jun. 1, 1999

[54] THERMALLY INSULATED ADSORBER

[75] Inventors: Jean-Yves Lehman, Maison-Alfort; Jean-Pierre Gourbier, Le Plessis Trevise, both of France

[73] Assignee: L'Air Liquide, Societe Anonyme pour l'Etude et l'Exploitation des Procedes Georges Claude, Paris Cedex, France

[21] Appl. No.: 08/997,839

[22] Filed: Dec. 24, 1997

[30] Foreign Application Priority Data

Dec. 24, 1996 [FR] France ................................. 96 15971

[51] Int. Cl.⁶ ................................................. B01D 53/04
[52] U.S. Cl. ............................... 96/126; 96/144; 96/152
[58] Field of Search ............................... 96/126, 144, 152, 96/143, 145, 146; 95/148, 123, 124, 114, 99, 288

[56] References Cited

U.S. PATENT DOCUMENTS

| | | | |
|---|---|---|---|
| 2,083,732 | 6/1937 | Moore et al. | 96/126 |
| 2,223,588 | 12/1940 | Watson et al. | 96/126 |
| 2,359,660 | 10/1944 | Martin et al. | 95/124 |
| 2,551,160 | 5/1951 | Rehrig et al. | 138/148 |
| 2,709,496 | 5/1955 | Baker | 96/144 |
| 2,790,505 | 4/1957 | Dow | 95/124 |
| 3,925,041 | 12/1975 | Patterson et al. | 96/133 |

FOREIGN PATENT DOCUMENTS

| | | |
|---|---|---|
| 0 118 349 | 9/1984 | European Pat. Off. . |
| 2 129 032 | 10/1972 | France . |

*Primary Examiner*—Duane S. Smith
*Attorney, Agent, or Firm*—Young & Thompson

[57] ABSTRACT

A thermally insulated adsorber (1) intended for treating a gas by passing the gas through a bed (15) of an active material, of the type including a cylindrical shell (5) provided with thermal insulation (21) including a wall (25), which is, in particular, parallel to the shell (5) and which, together with the shell, defines a gas-filled cavity (27), the wall (25) and consequently the gas-filled cavity (27) being placed inside the shell (5), between the latter and a bed (15) of an active material arranged inside the shell (5). The gas-filled cavity (27) communicates with a part of the adsorber (1) which includes the gas that is to be treated and/or with a part of the adsorber which includes the gas that has been treated. The adsorber furthermore includes elements (43) for blocking any gas flow through the gas-filled cavity in order to separate the gas that is to be treated from the gas that has been treated. The adsorber may be used to purify the air sent to air distillation plants.

17 Claims, 2 Drawing Sheets

THERMALLY INSULATED ADSORBER

FIELD OF THE INVENTION

The invention relates to a thermally insulated adsorber of the type comprising a cylindrical shell provided with thermal insulation means, and more particularly to an adsorber for purifying the air sent to air distillation plants.

BACKGROUND OF THE INVENTION

Air distillation plants generally include adsorbers so as to subject the air, compressed on entering the plant, to a drying and decarbonation treatment before it is cooled and then introduced into the distillation column proper. For this purpose, the air to be treated flows under a pressure typically of about 5 bar absolute through a bed of an adsorbent based in the adsorber. Once the adsorption capacity of the bed has been exhausted, the adsorbent is regenerated by means of a dry and decarbonated gas. This gas may be an off-gas recovered from the distillation column and injected into the adsorber in the reverse direction. In order to increase the regeneration effectiveness, this off-gas is heated to a high temperature of about 200° C. This type of adsorber, in which the adsorbent is subject to cyclic temperature variations, is known by the name "TSA (Temperature Swing Adsorption) adsorber".

Heating the gas as well as the adsorbent represents a major part of the energy consumed by the distillation plant. In order to minimize this consumption, it is therefore necessary to reduce the heat exchange between the adsorber and its environment.

Thermal insulation means consisting of an outer covering of the walls of the adsorber are known. This type of insulation proves to be very effective for the entire adsorber but does have certain drawbacks when the adsorber is subjected in a cyclic manner to temperature variations. This is because, since the walls of the adsorbers are generally made of metal, these constitute, depending on the phase of the cycle a heat store or heat sink tending to delay establishment of a steady state after a temperature change. In the regeneration phase, the walls absorb part of the heat provided by the heated gas and thus delay the heating of the adsorbent, in particular in regions close to the walls. In the adsorption phase, they restore this heat, thereby decreasing the adsorption effectiveness of the adsorbent. The walls therefore act out of step with the cycles and considerably decrease the effectiveness of the adsorber.

This phenomenon could be counteracted by increasing the size of the adsorbers and consequently by reducing, for a constant flow, the frequency of the cycles. However, recent developments in distillation plants have led to a reduction in the size of the adsorbers so as to reduce the amount of adsorbent and the cost of an adsorber. Because of the fact that the amount of adsorbent is reduced, the frequency of the cycles is considerably increased.

In order to improve the effectiveness of the known absorbers, adsorbers are known which are equipped with internal thermal insulation. Such internal thermal insulation must satisfy particular requirements:

it must not allow bypassing of gas between the wall of the adsorber and the bed of adsorbent, so that the gas that is to be treated and the gas that has been treated are always separate;

it must withstand the repeated compressions and decompressions imposed by the operating cycle and be able to attain pressure variations of about ten bar; and it must easily allow periodic hydrostatic testing, this being generally required by the authorities in the operating countries.

Document US-A-3,925,041 teaches a TSA adsorber equipped with internal thermal insulation. This adsorber comprises a cylindrical shell oriented vertically, the ends of which are closed by ellipsoidal parts forming, respectively, a dome and a bottom. A bed of adsorbents is placed in the cylindrical shell In the region of the bed of adsorbent, the internal thermal insulation is produced by sheets of a rigid insulant, these being applied end to end against the shell and compressing, against this shell, a layer of a fibrous insulating material. This thermal insulation is therefore placed between the shell and the bed of adsorbent. In order to prevent bypassing of the gases through this insulation during operation, metal sheets are applied against the shell, covering the sides of the sheets of insulant so as to deflect the flow of gas towards the bed of adsorbent.

Furthermore, a fibrous insulant is applied by means of bolts against the internal parts of the dome and of the bottom of the adsorber.

Although this internal thermal insulation considerably increases the effectiveness of an adsorber, it is not suitable for undergoing a hydrostatic test. This is because, after such a test, the thermal insulation is wet and ineffective. It must therefore undergo lengthy, difficult and consequently very expensive drying. Moreover, fitting the sheets of insulant and the metal sheets in the region of the bed, of adsorbent proves to be difficult and lengthy so that only specialists are able to place this insulation against the internal walls of the adsorber. This known insulation therefore considerably increases the cost of manufacturing of the adsorber.

SUMMARY OF THE INVENTION

The invention is intended to solve these various problems by providing thermal insulation for the adsorber which satisfies the aforementioned requirements and which is easy and inexpensive to fit.

For this purpose, the subject of the invention is a thermally insulated adsorber intended for treating a gas by passing the gas through a bed of an active material, of the type comprising a cylindrical shell provided with thermal insulation means, the thermal insulation means including a wall which is, in particular, parallel to the shell and which, together with the shell, defines a gas-filled cavity, the wall and consequently the gas filled cavity being placed inside the shell, between the latter and a bed of an active material arranged inside the shell, characterized in that the gas-filled cavity communicates with a part of the adsorber which includes the gas that is to be treated and/or with a part of the adsorber which includes the gas that has been treated and in that it includes means for blocking any gas flow through the gas-filled cavity in order to separate the gas that is to be treated from the gas that has been treated.

The adsorber according to the invention may include one or more of the following characteristics:

the blocking means include at least one separating wall fitted between the said wall and the shell;

the adsorber comprises means for decreasing natural convection in the gas-filled cavity;

the means for decreasing natural convection in the gas-filled cavity comprise a sheet, in particular a metal sheet, placed between the wall and the shell in the gas-filled cavity in order to obtain a double gas-filled cavity;

the sheet is centered with respect to the said wall and to the shell;

the gaps between the sheet and the wall and between the sheet and the shell are between 10 and 40 mm, and preferably equal to 20 mm;

the absorber comprises elements, especially point or linear elements, forming spacers between, on the one hand, the wall and the sheet and, on the other hand, between the sheet and the shell;

the elements forming spacers between the wall and the sheet are offset with respect to the elements forming spacers between the sheet and the shell;

the elements forming spacers are indented portions and raised portions preferably produced by goffering in the sheet, these indented portions and raised portions having, in particular, pointed ends;

the indented portions and raised portions of the sheet extend parallel to the axis of the shell, over the entire length of that dimension of the sheet which is parallel to this axis, and have a cross-section of approximately triangular shape;

the indented portions and raised portions alternate on each face of the sheet;

in the case of an adsorber having a shell which is extended into a part forming a dome, the adsorber includes at least one and preferably two layers of a felt of fibres applied against the inside of the dome;

for an adsorber intended, in particular, to operate under a varying pressure, the felt of fibres includes ceramic fibres and has a ratio between the fluid resistivity and Young's modulus of elasticity of less than 1 s/m$^2$;

the thickness of the or each layer of felt is between 20 and 30 mm, and preferably equal to about 25 mm;

the layers of felt are attached to the inside of the dome by means of removable attachment devices;

the removable attachment devices comprise rods, fastened to the dome and intended to transpierce the layers of felt, and washers for holding the felt against the dome, the washers engaging with the rods, in particular by a clip-in mechanism; and the adsorber is used in particular for the purification of air sent into an air distillation plant, the active material being an adsorbent.

BRIEF DESCRIPTION OF THE DRAWINGS

Other features and advantages of the invention will emerge from the following description given by way of example but without any limiting character, with regard to the appended drawings in which.

DETAILED DESCRIPTION OF THE INVENTION

Figure 1:
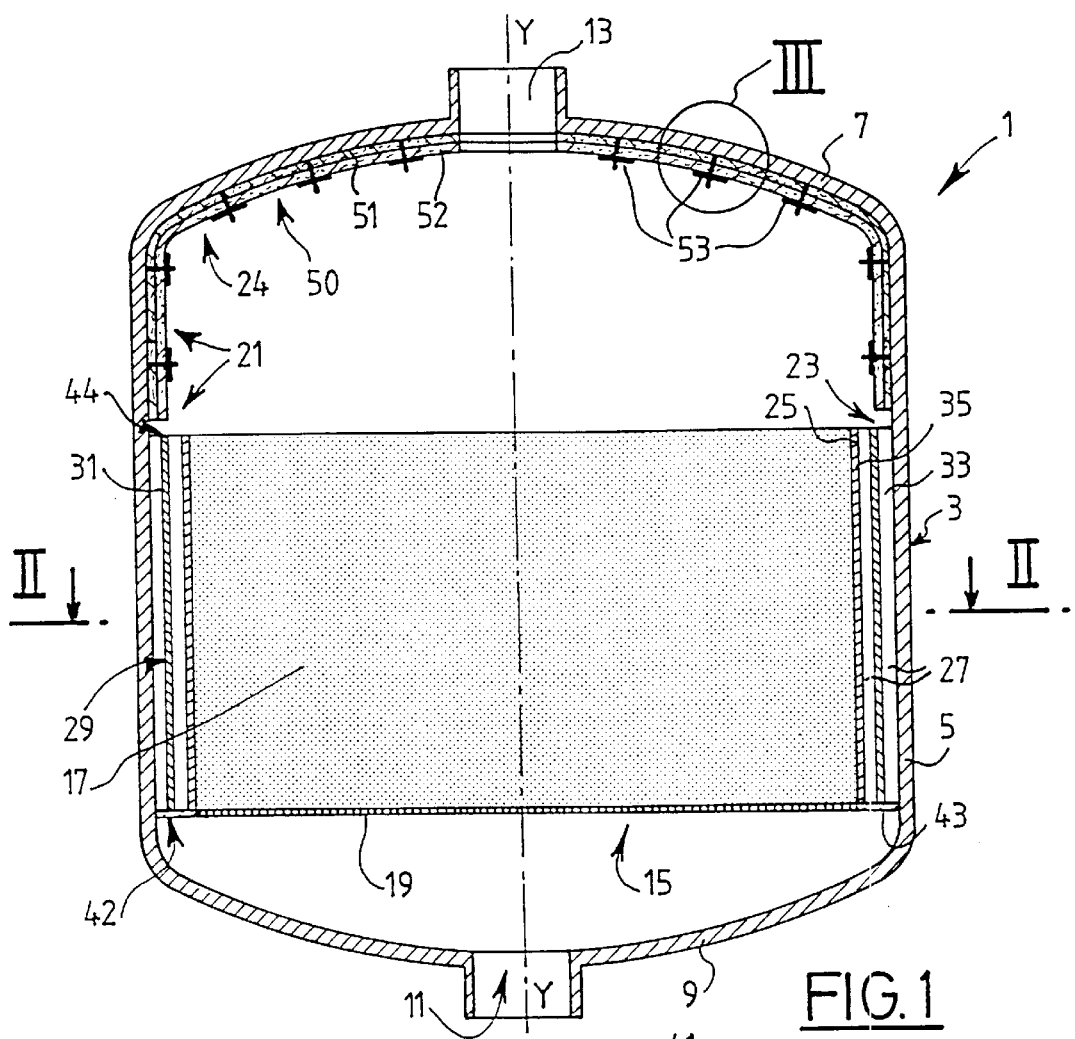
FIG. 1 is a sectional view on the line I—I in FIG. 2 of an adsorber according to the invention.

FIG. 1 shows an adsorber 1 according to the invention. In this illustrative embodiment, the adsorber 1 is for the drying and decarbonating of atmospheric air intended for an air distillation plant.

The adsorber 1 comprises a vessel 3 of cylindrical general shape and oriented along a vertical axis Y—Y. The vessel 3 is formed from a cylindrical shell 5 which is extended upwards by a part forming a dome 7 and downwards by a part forming a bottom 9. The dome 7 and the bottom 9 each have an ellipsoidal or spherical shape. The elements 5, 7 and 9 are made of steel.

At its lower end, the bottom 9 includes a central opening 11 which serves as an inlet port for a gas that is to be treated during the adsorption period and which serves as an outlet port during the regeneration period.

At its upper end, the dome 7 includes a central opening 13 which serves as an outlet port for a gas that has been treated during the adsorption period and which serves as an inlet port for gas that has been heated during the regeneration period.

A bed 15 of adsorbent is fitted inside the shell 5. This bed 15 comprises an adsorbent 17 resting on a support 19, such as a mesh for example, allowing a gas to pass through the adsorbent 17. Typically, the bed 15 of adsorbent has a height of between 1 m and 1.5 m and, depending on the charge of air that is to be treated, a diameter of between 0.5 m and 5 m.

In order to decrease the consumption of energy by the adsorber 1 during the operating cycles, the latter is equipped with internal thermal insulation means 21.

These means 21 comprise a first thermal insulation 23 placed between the adsorbent 17 and the shell 5 and a second thermal insulation 24 applied against the inside of the dome 7.

The means 23 comprise a cylindrical wall 25 parallel to the shell 5 and attached to the support 19. This wall 25 defines a gas-filled cavity 27 between the natural convection is placed in the gas-filled cavity 27 so as to reduce heat exchange between the shell 5 and the adsorbent 17.

In the illustrative embodiment, the means 29 comprises a sheet 31, in particular a metal sheet, having a thickness of about 0.5 mm, which is placed between the wall 25 and the shell 5. This sheet 31 has a cylindrical shape and is preferably centered with respect to the wall 25 and to the shell 5 in order to obtain a double gas-filled cavity 33, 35. The gaps between the sheet 31 and the wall 25 and between the sheet 31 and the shell 5 are between 10 and 40 mm and preferably equal to 20 mm.

Figure 2:
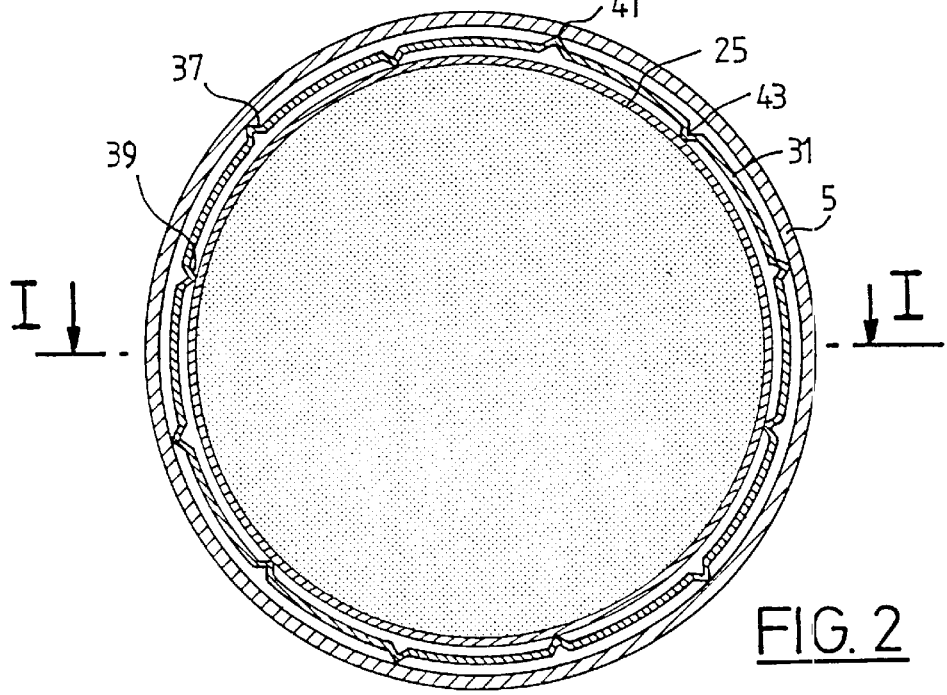
FIG. 2 is a sectional view on the line II—II of the adsorber in FIG. 1.

As may be seen in FIG. 2, the adsorber comprises elements 37 and 39 forming spacers between, on the one hand, the wall 25 and the sheet 31 and, on the other hand, the sheet 31 and the shell 5, in order to keep the sheet 31 in position.

Advantageously, the elements 37 and 39 forming spacers are inner and outer ribs preferably produced by goffering in the sheet 31. The outer ribs 37 and inner ribs 39 extend parallel to the axis of the shell 5 over the entire extent of the sheet 31 which is parallel to this vertical axis Y—Y.

The ribs 37 are offset with respect to the ribs 39 and, more specifically, alternate with the latter. This arrangement of the spacers lengthens the path for conductive heat transfer between the shell 5 and the adsorbent 17 and therefore reduces heat exchange between them.

In order to decrease heat transfer between the shell 5 and the adsorbent 17 even more, the area of contact between shell and sheet and the between sheet and wall is reduced. For this purpose, the ribs 37 and 39 each have a cross-section of substantially triangular shape with pointed ends 41 and 43. These ends 41 and 43 bear respectively against the shell 5 and against the wall 25.

As may be seen in FIG. 1, the lower end 42 of the gas-filled cavity 27 is closed by an annular separating wall 43 which surrounds the mesh 19. This wall 43 prevents any bypassing of gas, so that the gas entering either via the opening 11 or via the opening 13 must necessarily pass through the bed 15 of adsorbent during operation.

On the other hand, the upper end 44 of the gas-filled cavity 27 is open so as to allow equilibration of the pressure in the gas-filled cavity with that of the upper part of the adsorber 1.

The second internal thermal insulation 24 is produced by at least one and preferably two layers 51, 52 of a felt 50 of ceramic fibers, these being applied against the inside of the dome 7. The thickness of each layer is between 20 and 30 mm; preferably equal to 25 mm.

In order to withstand the repeated compressions and decompressions imposed by the operating cycle of the adsorber, the Applicant has found a felt which meets the requirements of the operating cycle of an adsorber. This felt 50 has a fluid resistivity of about 60,000 $Pa.s/m^2$. The fluid resistivity is defined by the ratio between, on the one hand, a pressure drop $\Delta P$ induced by a felt of unit area and unit thickness in a gas flow at atmospheric pressure and, on the other hand, a flow rate of this same gas through the felt. In addition, this felt 50 has a Young's modulus of elasticity E of greater than $4 \times 10^6$ Pa, giving a felt 50 good mechanical integrity. The Applicant has observed that a felt having a ratio between the fluid resistivity and Young's modulus of elasticity of less than 1 $s/m^2$ is particularly suitable for application in TSA adsorbers and allows considerable reduction in the number of points of attachment of the felt to the wall of the dome without the mechanical integrity of the felt being affected.

Figure 3:
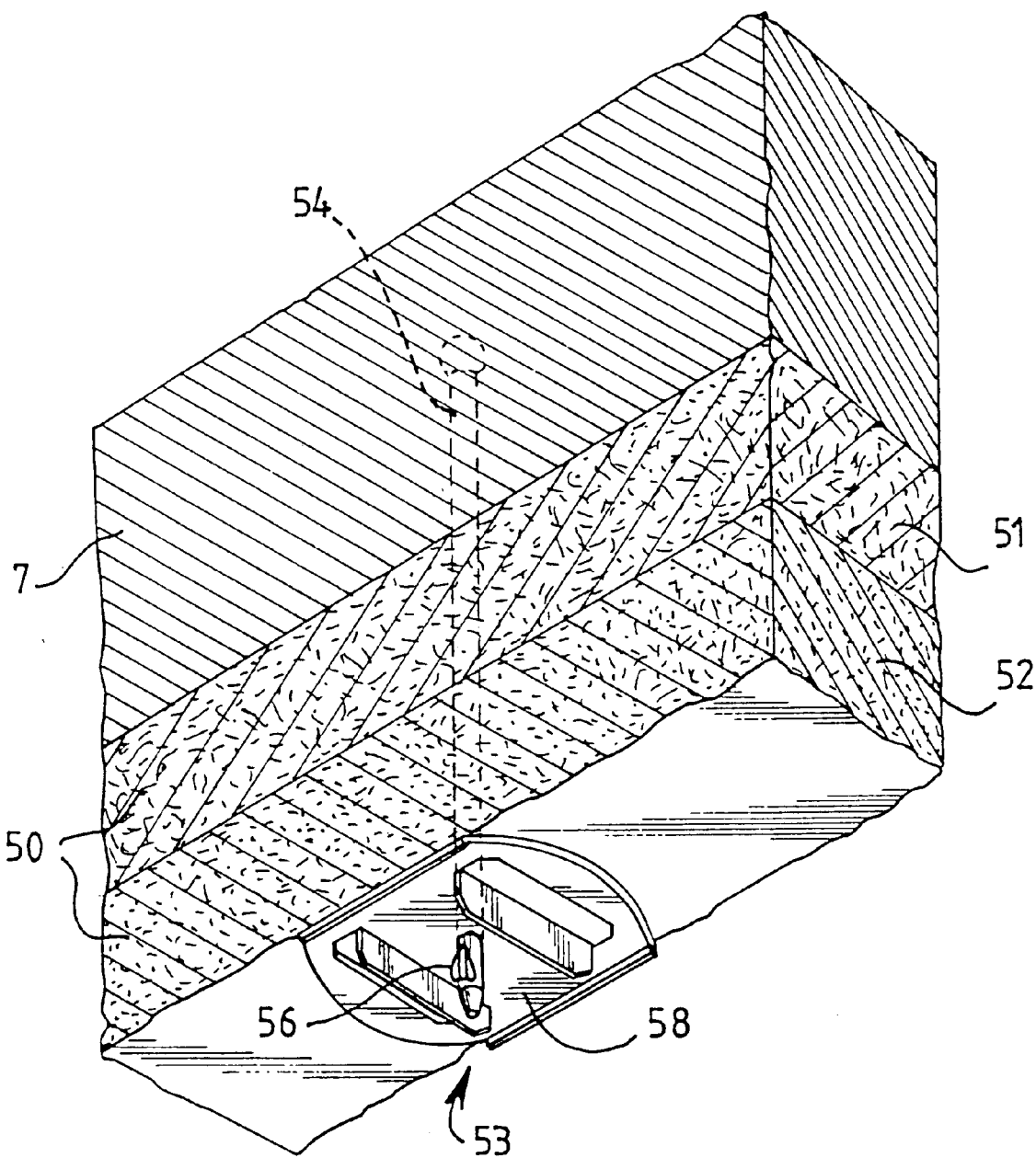
FIG. 3 is an enlarged view of a detail III in FIG. 1.

The felt 50 is fixed to the inside of the dome 7 by using removable attachment devices 53 which are shown in detail in FIG. 3. Each removable attachment device includes a rod 54 welded to the dome 7 and approximately perpendicular to its wall. The rod 54 transpierces the two layers 51 and 52 of felt 50 and includes projections 56 which engage, by a clip-in mechanism, with a washer 58 for holding the felt against the dome 7.

The operation of the adsorber according to the invention will be described below.

Adsorption phase:

During the adsorption cycle, the air that is to be treated enters the adsorber 1 via the opening 11. The air, still containing water and carbon dioxide, passes through the adsorber bed 15 and is dried and decarbonated before leaving, purified, via the opening 13. The separating wall 43 closing the lower end of the gas-filled cavity 27 prevents the gas that is to be treated from bypassing through the gas-filled cavity. This adsorption phase generally takes place at a high pressure, for example 5 bar absolute.

Regeneration phase:

When changing from the high-pressure regime to the atmospheric-pressure regime for regeneration, the gas that has accumulated in the felt 50 and between the latter and the dome part 7 will easily flow out into the interior of the adsorber 1 because of the low resistivity of the felt 50. The latter will therefore only rise slightly and will readily resume its initial shape because of the modulus of elasticity chosen.

During regeneration of the adsorbent 17, dry and decarbonated impure nitrogen at a pressure of about 1 bar absolute, which is heated to about 200° C., is injected into the adsorber 1 via the opening 13.

On account of the fact that the hot gas enters the double gas-filled cavity 33 and 35, the effectiveness of the thermal insulation of this double cavity is further increased because of the lower density of the heated gas. The presence of the sheet 31 reduces the possibility of flow by natural convention being established, so that there is little heat exchange between the shell 5 and the adsorbent 17.

The Applicant has observed that only the dome 7 and the adsorbent 17 have to be thermally insulated. This is why the bottom 9 of the adsorber 1 is not provided with thermal insulation, thereby allowing even greater reduction in the cost of the adsorber.

Hydrostatic test:

During a hydrostatic test, the felt 50 is easily removed because of the removable attachment devices 53. After the test, all that is required is for one or two new layers of felt 50 to be relaid. This is inexpensive and can be carried out even by non-specialists.

We claim:

1. A thermally insulated adsorber intended for treating a gas by passing the gas through an adsorbent bed, comprising a cylindrical shell provided with thermal insulation means, said thermal insulation means including a first wall which is parallel to the shell, and which together with the shell defines a gas-filled cavity, said first wall and said gas-filled cavity being placed inside the shell, between the shell and an adsorbent bed arranged inside the shell, wherein the gas-filled cavity communicates with at least one of a part of the adsorber which includes the gas that is to be treated and a part of the adsorber which includes the gas that has been treated, and said gas-filled cavity including means for blocking any gas flow through the gas-filled cavity in order to separate the gas that is to be treated from the gas that has been treated.

2. The adsorber according to claim 1, wherein the blocking means include at least one separating wall fitted between the first wall and the shell.

3. The adsorber according to claim 1, further comprising means for decreasing natural convection in the gas-filled cavity.

4. The adsorber according to claim 3, wherein the means for decreasing natural convection in the gas-filled cavity comprise a sheet placed between the first wall and the shell in the gas-filled cavity, thereby obtaining a double gas-filled cavity.

5. The adsorber according to claim 4, wherein the sheet is centered with respect to the first wall and the shell.

6. The adsorber according to claim 4, wherein the gaps between the sheet and the first wall, and between the sheet and the shell are between 10 and 40 mm.

7. The adsorber according to claim 6, wherein the gaps are equal to about 20 mm.

8. The adsorber according to claim 4, further comprising spacer elements between the first wall and the sheet, and between the sheet and the shell.

9. The adsorber according to claim 8, wherein the spacer elements between the first wall and the sheet are offset with respect to the spacer elements between the sheet and the shell.

10. The adsorber according to claim 8, wherein the spacer elements are indented portions and raised portions having pointed ends.

11. The adsorber according to claim 10, wherein the indented portions and raised portions of the sheet extend parallel to a vertical axis of the shell, over the entire extent of the sheet which is parallel to said axis, and have a cross-section of substantially triangular shape.

12. The adsorber according to claim 10, wherein the indented portions and the raised portions alternate on each face of the sheet.

13. The adsorber according to claim 1, wherein the shell extends into a part forming a dome, and includes at least two layers of a felt of fibers, said layers being applied against the inside of the dome.

14. The adsorber according to claim 13, intended to operate under a varying pressure, wherein the felt of the fibers includes ceramic fibers and has a ratio between the fluid resistivity and Young's modulus of elasticity of less than 1 s/m$^2$.

15. The adsorber according to claim 13, wherein the thickness of each layer of felt is between 20 and 30 mm.

16. The adsorber according to claim 13, wherein the layers of felt are secured to the inside of the dome by means of removable attachment devices.

17. The adsorber according to claim 16, wherein the removable attachment devices comprise rods, fastened to the dome and intended to transpierce the layers of felt, and washers for holding the felt against the dome, said washers engaging with the rods by a clip-in mechanism.

* * * * *